(12) United States Patent
Zhang et al.

(10) Patent No.: US 10,451,824 B2
(45) Date of Patent: Oct. 22, 2019

(54) OPTICAL CONNECTOR

(71) Applicant: FUJITSU COMPONENT LIMITED, Tokyo (JP)

(72) Inventors: Hongfei Zhang, Tokyo (JP); Satoshi Moriyama, Tokyo (JP); Shinichiro Akieda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/050,262

(22) Filed: Jul. 31, 2018

(65) Prior Publication Data
US 2019/0041593 A1    Feb. 7, 2019

(30) Foreign Application Priority Data

Aug. 4, 2017    (JP) .................................. 2017-151251

(51) Int. Cl.
*G02B 6/42* (2006.01)
(52) U.S. Cl.
CPC ........... *G02B 6/4261* (2013.01); *G02B 6/423* (2013.01)

(58) Field of Classification Search
None
See application file for complete search history.

(56) References Cited

U.S. PATENT DOCUMENTS

| | | | |
|---|---|---|---|
| 6,746,158 B2* | 6/2004 | Merrick | G02B 6/4201 24/605 |
| 2004/0077207 A1 | 4/2004 | Ice | |
| 2012/0251049 A1* | 10/2012 | Meadowcroft | G02B 6/4261 385/53 |
| 2016/0266340 A1* | 9/2016 | Zhang | G02B 6/32 |

* cited by examiner

*Primary Examiner* — Chad H Smith
(74) *Attorney, Agent, or Firm* — IPUSA, PLLC

(57) ABSTRACT

An optical connector for detachable coupling to a cage includes a case having a guide portion and a pull-tab movably attached to the case, wherein the pull-tab includes an arm made of an elastic material and configured to slide on the guide portion of the case to be elastically deformed upon the pull-tab being moved in a removal direction in which the optical connector is uncoupled from the cage, and wherein moving the pull-tab in the removal direction relative to the case against an elastic force applied by the arm causes the pull-tab to disable a lock that secures the case to the cage.

8 Claims, 19 Drawing Sheets

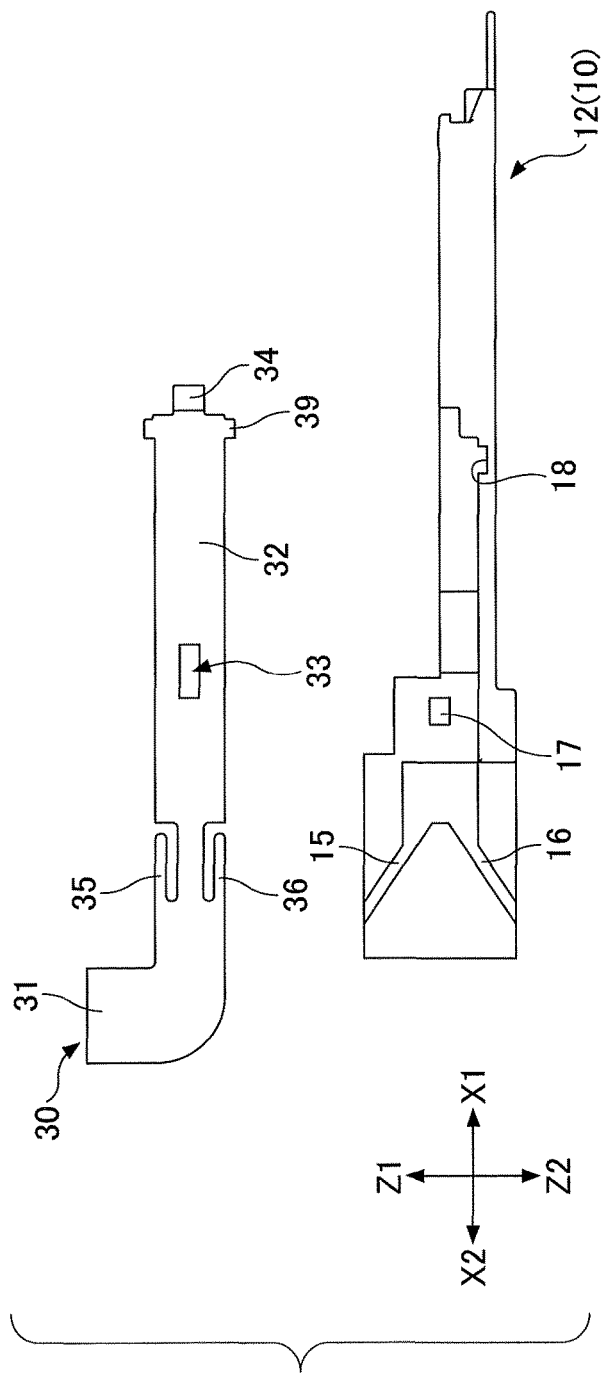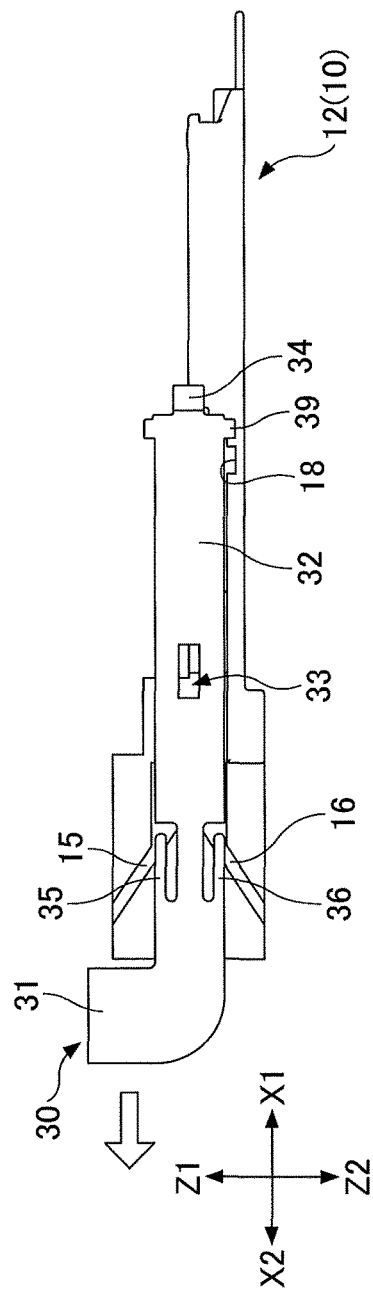

OPTICAL CONNECTOR

BACKGROUND OF THE INVENTION

1. Field of the Invention

The disclosures herein relate to an optical connector.

2. Description of the Related Art

Optical connectors conforming to the QSFP (quad small form-factor pluggable) standard are known to perform conversion between digital electrical signals and optical signals in communications for high-speed signal transmission in the high-speed interfaces of supercomputers, high-end servers, and the like.

Optical connectors have a case and a substrate disposed therein on which electric components such as photoelectric conversion devices are mounted. An optical connector is detachably inserted into a cage mounted on a substrate (e.g., motherboard) in a communication apparatus so as to be electrically and mechanically coupled to an electric interface connector provided inside the cage. This arrangement enables optical communication by performing conversion between optical signals from/to optical fibers and electrical signals from/to the substrate of the communication apparatus.

An optical connector may be provided with a latch for locking the optical connector to the cage in order to prevent disconnection from the cage during use (see Patent Document 1, for example). The latch is moved in the direction in which the optical connector is pulled off of the cage to disable the lock of the cage with respect to the case. This allows the optical connector to be pulled off of the cage. When a force applied in the direction in which the optical connector is pulled off of the cage is no longer exerted, the latch returns to its original position due to a spring disposed inside the case.

The above-noted optical connector has an increased number of components for the provision of the spring inside the case. Further, additional assembling steps are needed to attach the spring to the case when assembling the optical connector. Moreover, the spring is a minute component having spring property, which makes it burdensome to attach the spring to the case, and there is also a risk of the spring being lost.

There may be a need for an optical connector for which the number of components and the number of assembling steps are reduced.

RELATED-ART DOCUMENTS

Patent Document

[Patent Document 1] United States Patent Application Publication No. 2004/0077207

SUMMARY OF THE INVENTION

It is a general object of the present invention to provide an optical connector that substantially obviates one or more problems caused by the limitations and disadvantages of the related art.

According to an embodiment, an optical connector for detachable coupling to a cage includes a case having a guide portion and a pull-tab movably attached to the case, wherein the pull-tab includes an arm made of an elastic material and configured to slide on the guide portion of the case to be elastically deformed upon the pull-tab being moved in a removal direction in which the optical connector is uncoupled from the cage, and wherein moving the pull-tab in the removal direction relative to the case against an elastic force applied by the arm causes the pull-tab to disable a lock that secures the case to the cage.

According to at least one embodiment, the number of components and the number of assembling steps are reduced.

BRIEF DESCRIPTION OF THE DRAWINGS

Other objects and further features of the present invention will be apparent from the following detailed description when read in conjunction with the accompanying drawings, in which:

FIGS. 6A through 6D are drawings illustrating the assembling of the optical connector illustrated in FIGS. 1A and 1B;

DESCRIPTION OF THE PREFERRED EMBODIMENTS

In the following, embodiments will be described by referring to the accompanying drawings. In these drawings, the same elements are referred to by the same references, and a description thereof may be omitted.

In the following description, the direction indicated by an arrow X1 is referred to as an insertion direction, and the direction indicated by an arrow X2 is referred to as a removal direction. The direction indicated by Y1 and Y2 is referred to as a width direction, and the direction indicated by an arrow Z1 is referred to as an upward direction, with the direction indicated by an arrow Z2 being referred to as a downward direction.

The optical connector according to embodiments is configured to be detachably coupled to a cage, which is mounted on a substrate (e.g., motherboard) of an electronic apparatus, for example.

<First Embodiment>

Figure 1A:
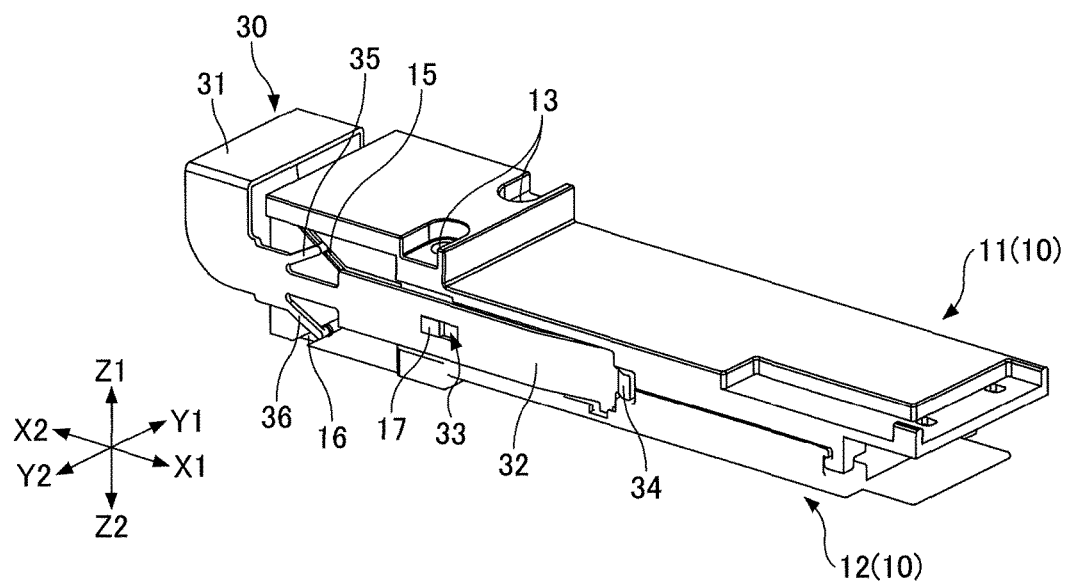
FIGS. 1A and 1B are drawings illustrating an optical connector of a first embodiment.
Figure 1B:
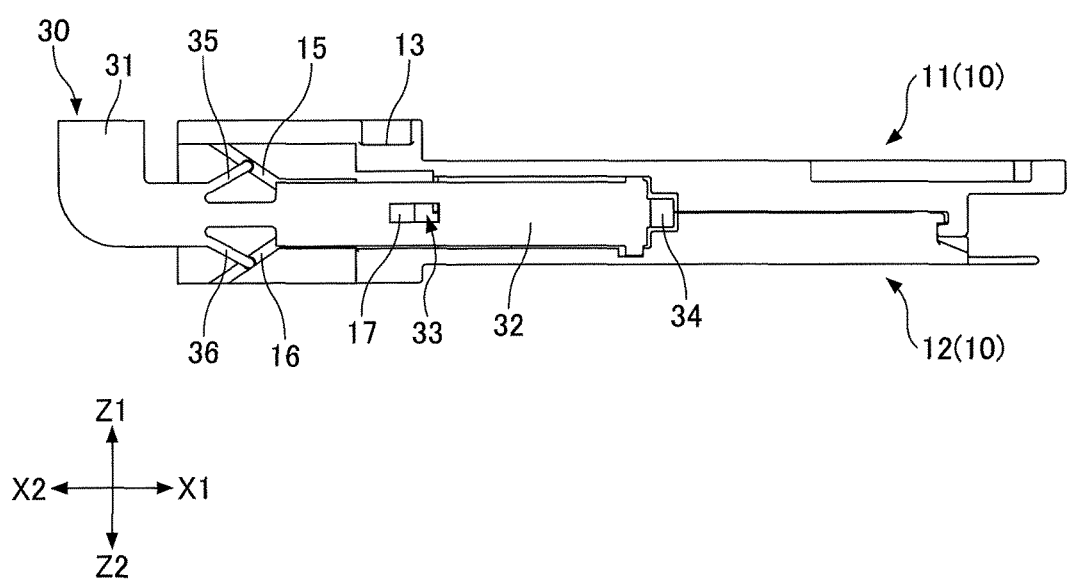
Figure 2A:
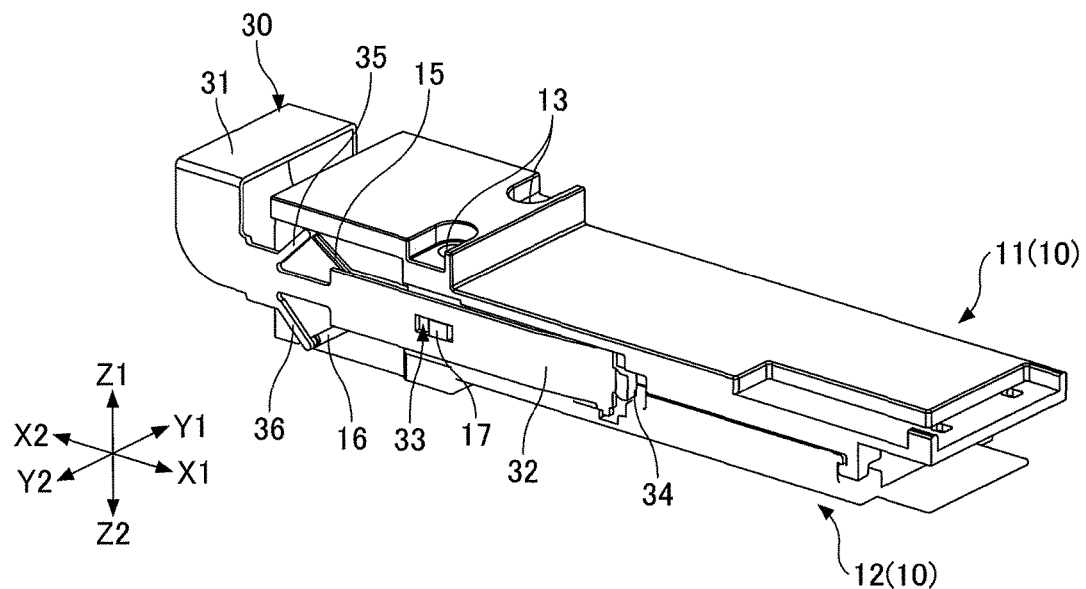
FIGS. 2A through 2C are drawings illustrating the optical connector of the first embodiment.
Figure 2B:
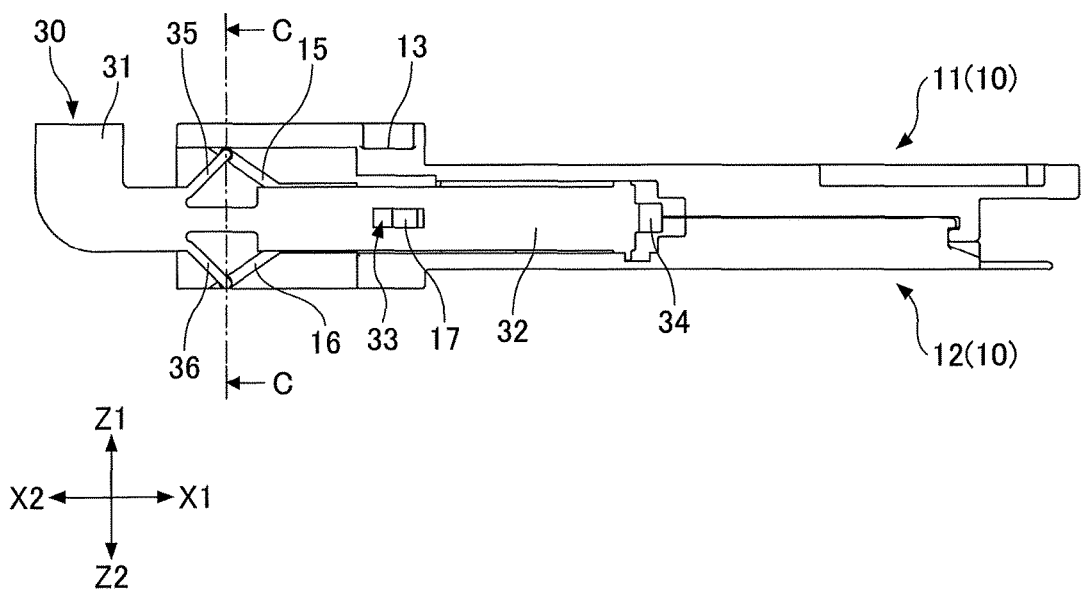
Figure 2C:
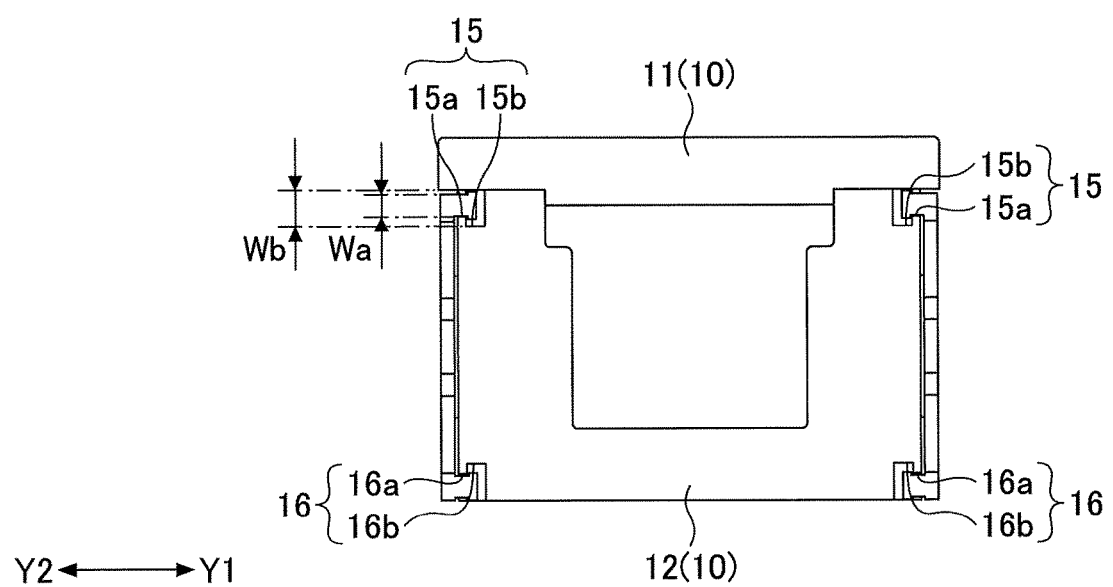

In the following, an optical connector according to a first embodiment will be described. FIGS. 1A and 1B and FIGS. 2A through 2C are drawings illustrating the optical connector of the first embodiment. FIGS. 1A and 1B illustrate the optical connector in a locked state, and FIGS. 2A through 2C illustrate the optical connector in an unlocked state. FIG. 1A and FIG. 2A are isometric views, and FIG. 1B and FIG. 2B are side-elevation views. FIG. 2C is a cross-sectional view taken along the dash dot line C-C shown in FIG. 2B.

As illustrated in FIGS. 1A and 1B and FIGS. 2A through 2C, the optical connector of the present embodiment is a densely packed optical connector conforming to the QSFP standard. The optical connector includes a case 10 and a pull-tab 30.

The case 10 includes an upper case 11 and a lower case 12. The upper case 11 has pass holes 13 through which respective screws pass. The lower case has screw holes 14 (see FIG. 3) in which the screws are threadably engaged. The screws are inserted into the pass holes 13 and threadably engaged with the screw holes 14 so that the upper case 11 is fastened to the lower case 12. The case 10 stores an optical module, a printed board, a cable boot, and the like.

Figure 3A:
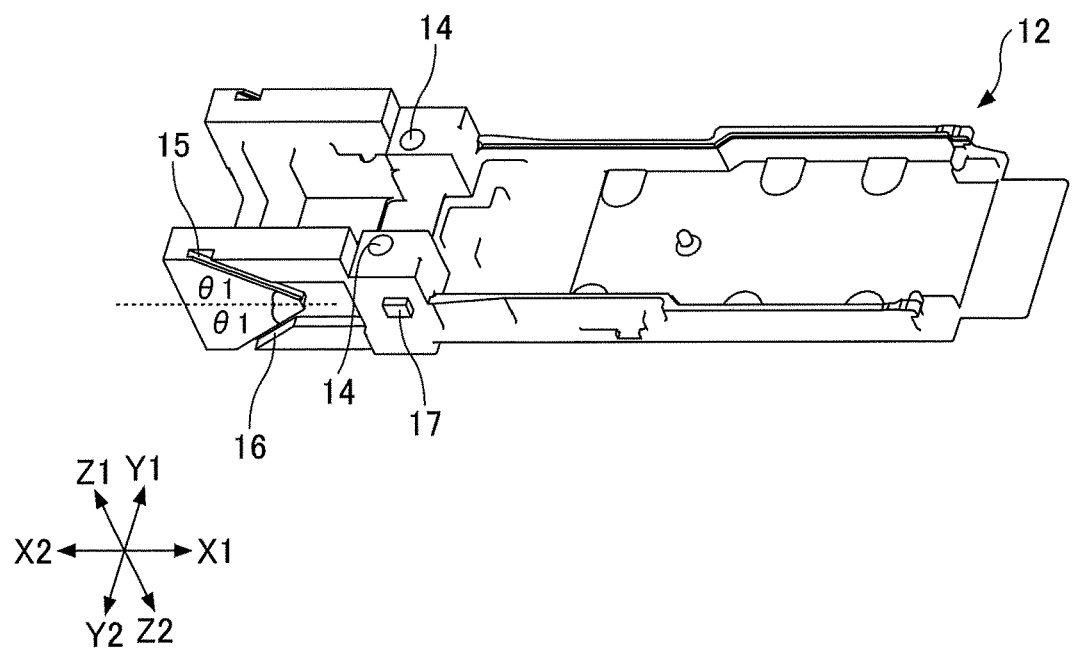
FIGS. 3A and 3B are drawings illustrating a lower case of the optical connector illustrated in FIGS. 1A and 1B.
Figure 3B:
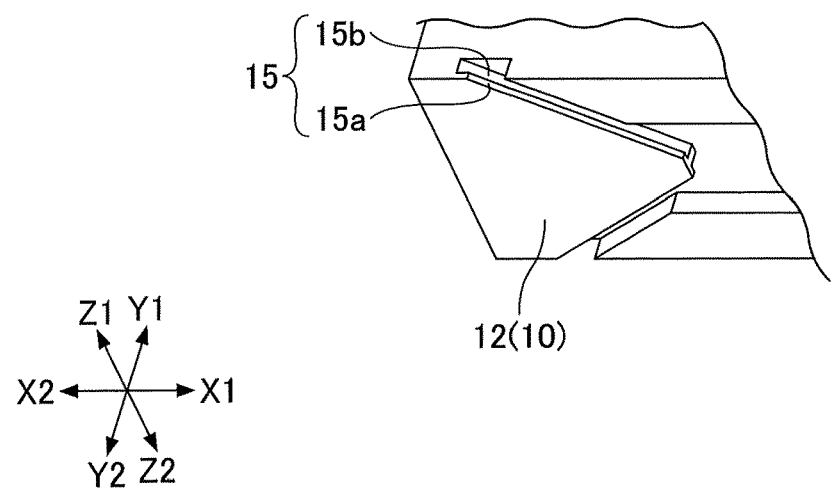

FIGS. 3A and 3B are schematic views of the lower case 12. FIG. 3A is an axonometric view, and FIG. 3B is a partial enlarged view of what is shown in FIG. 3A.

The lower case 12 has guide grooves 15 and 16 formed in the lateral face on one side (i.e., Y2 side) and recessed inwardly (toward the Y1 direction). The guide groove 15 extends in the upward direction from the approximate vertical center of the lateral face of the lower case 12 toward the direction in which the optical connector is pulled off. The guide groove 16 extends in the downward direction from the approximate vertical center of the lateral face of the lower case 12 toward the direction in which the optical connector is pulled off. An angle θ1 formed by the guide grooves 15 and 16 relative to the removal direction may be 30 degrees to 40 degrees, and may be determined in response to the material of arms 35 and 36, which will be described later. As illustrated in FIG. 2C, the guide groove 15 includes a first groove 15a having a first width Wa and a second groove 15b having a second width Wb wider than the first width Wa and formed at a greater depth in the lower case 12 than the first groove 15a. Similarly to the guide groove 15, the guide groove 16 includes a first groove 16a and a second groove 16b. As illustrated in FIG. 2C, the guide grooves 15 and 16 are also formed on the lateral face of the lower case 12 on the other side (i.e., Y1 side). Each of the lateral faces of the lower case 12 has a rectangular projection 17 projecting outwardly.

Figure 4A:
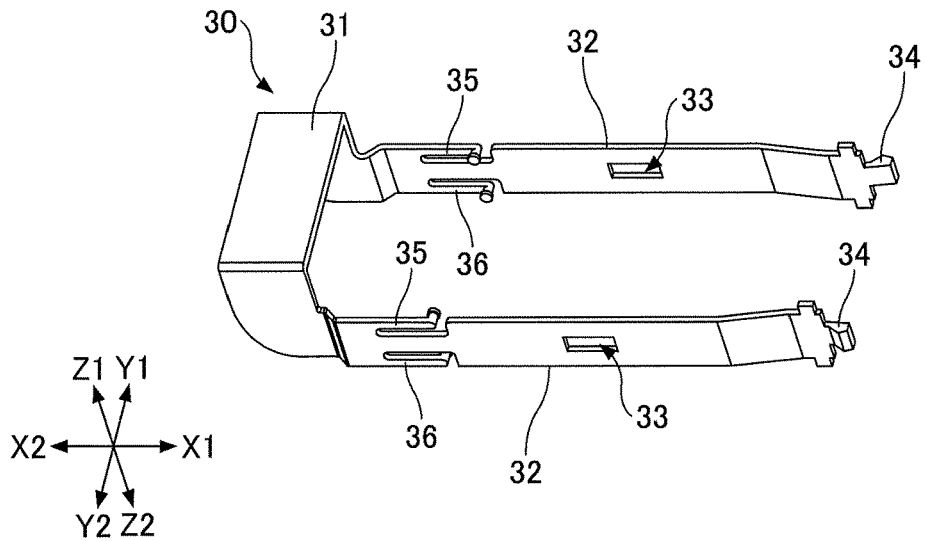
FIGS. 4A and 4B are drawings illustrating a pull-tab of the optical connector illustrated in FIGS. 1A and 1B.
Figure 4B:
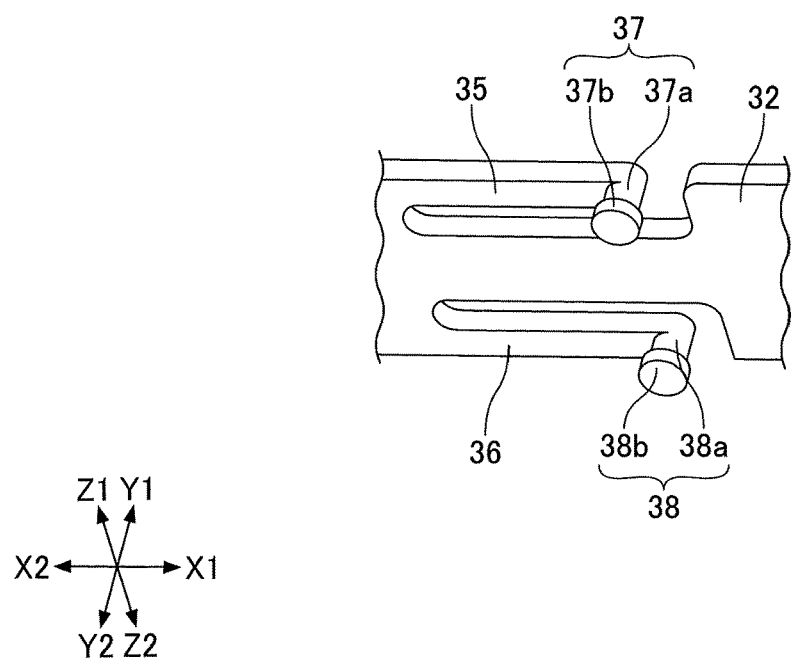
Figure 5A:
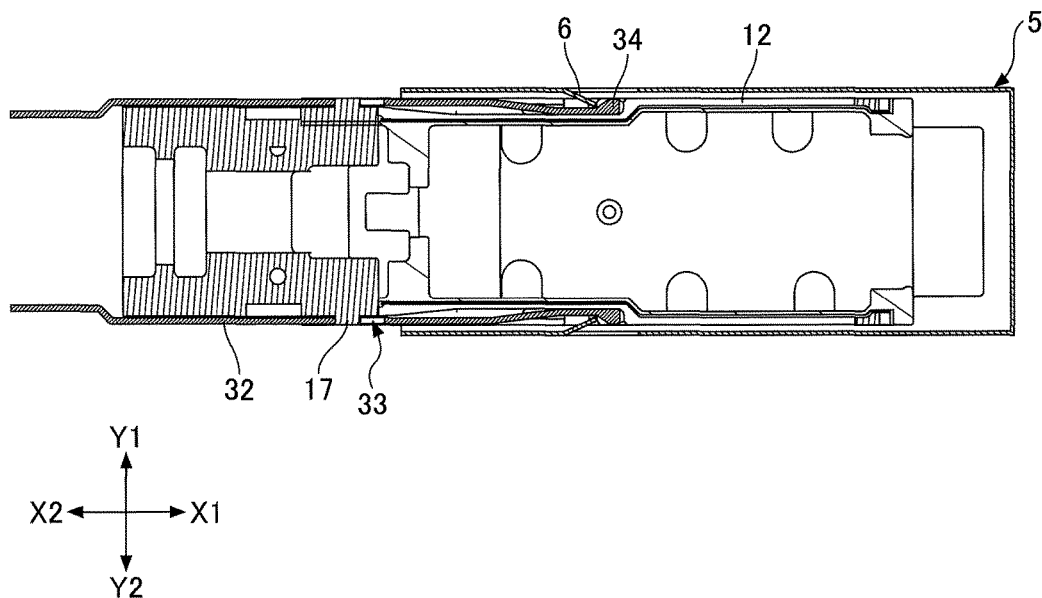
FIGS. 5A and 5B are drawings illustrating positional relationships between a cage and the pull-tab.
Figure 5B:
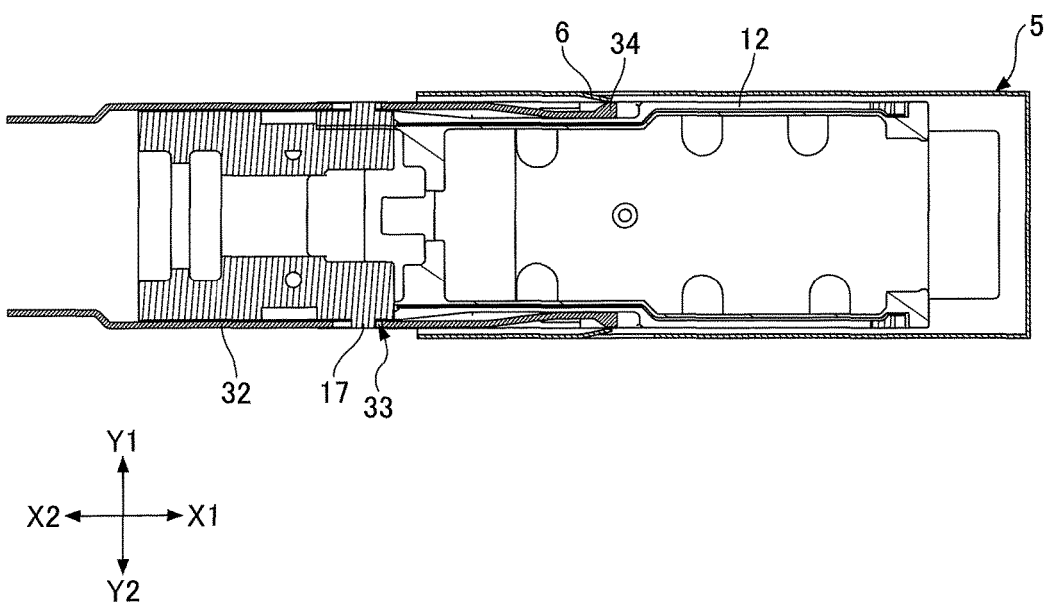

FIGS. 4A and 4B are schematic views illustrating the pull-tab 30. FIG. 4A is an axonometric view, and FIG. 4B is a partial enlarged view of what is shown in FIG. 4A. FIGS. 5A and 5B are drawings illustrating positional relationships between a cage 5 and a latch 32. FIG. 5A is a cross-sectional view of the optical connector and the cage placed in the locked position. FIG. 5B is a cross-sectional view of the optical connector and the cage 5 placed in the unlocked position.

The pull tab 30 is used when the optical connector inserted into the cage 5 is pulled off of the cage 5. The pull-tab 30 includes a body 31 and a latch 32. In the illustrated example, the body 31 and the latch 32 are formed as one seamless piece. Alternatively, the body 31 and the latch 32 may be formed as separate pieces.

The latch 32 extends in the insertion direction from the body 31. The latch 32 has rectangular holes 33. Each of the holes 33 is a rectangular shape such that a vertical length is slightly longer than the vertical length of the projection 17 of the lower case 12, and a length in the removal direction is longer than the length of the projection 17 in the removal direction. The holes 33 are engaged with the projections 17 to restrict the vertical movement of the latch 32 with respect to the case 10, such that the latch 32 is movable by a predetermined amount in the removal direction or in the insertion direction with respect to the case 10.

As illustrated in FIG. 5A, part of the cage 5 is folded inwardly to provide an anti-disengagement mechanism 6. With the optical connector placed in the locked state, a tip of the anti-disengagement mechanism 6 is in contact with the case of the optical connector, thereby preventing the optical connector from disengaging from the cage 5.

Each tip of the latch 32 has a lock disabling pin 34. The lock disabling pin 34 works on the anti-disengagement mechanism 6 of the cage 5 to disable the lock of the optical connector. Unlocking will be described later.

The latch 32 has arms 35 and 36. The arms 35 and 36 extend in the insertion direction from the body 31. The arms 35 and 36 and the remaining portions of the latch 32 are formed as one seamless piece. The arms 35 and 36 are made of an elastic material. Examples of the elastic material include a synthetic resin such as nylon, polyoxymethylene (POM), or polycarbonate.acrylonitrile.butadiene.styrene resin (polycarbonate-ABS resin) or a metal such as stainless or phosphor bronze. The thickness of the arms 35 and 36 may be the same as the thickness of the remaining portions of the latch 32, and may be 0.5 mm, for example.

The tips of the arms 35 and 36 have protuberances 37 and 38 extending toward the lower case 12 for engagement with the guide grooves 15 and 16, respectively. The protuberances 37 and 38 are configured to be slidable on the inner walls of the guide grooves 15 and 16, respectively. The protuberances 37 and 38 include first protuberances 37a and 38a having a cylindrical shape for engagement with the first grooves 15a and 16a, respectively, and also include second protuberances 37b and 38b having a cylindrical shape for engagement with the second grooves 15b and 16b, respectively. Movement of the pull-tab 30 in the removal direction or in the insertion direction causes the first protuberances 37a and 38a to slide on the inner walls of the first grooves 15a and 16a, respectively, and causes the second protuberances 37b and 38b to slide on the inner walls of the second grooves 15b and 16b, respectively.

The outer diameter of the second protuberances 37b and 38b are larger than the outer diameter of the first protuberances 37a and 38a, respectively. With this arrangement, the first grooves 15a and 16a prevent the second protuberances 37b and 38b from moving away from the lower case 12 even when a force is applied to the latch 32 in such a direction as to move the latch 32 away from the lower case 12. The protuberances 37 and 38 are thus prevented from disengaging from the guide grooves 15 and 16, respectively.

When pulling off the optical connector inserted into the cage 5, the user pulls the body 31 in the X2 direction. This pulling action causes the pull-tab 30 to move in the removal direction as illustrated in FIGS. 2A through 2C. When this happens, the first protuberances 37a and 38a and the second protuberances 37b and 38b slide on the inner walls of the first grooves 15a and 16a and the second grooves 15b and 16b, respectively, so that the arms 35 and 36 elastically deform such as to increase the distance between the tips thereof. As the lock disabling pins 34 move in the removal direction in conjunction with the movement of the latch 32 movable relative to the case 10, the lock disabling pins 34 cause the anti-disengagement mechanisms 6 to move outwardly as illustrated in FIG. 5B, thereby disabling the lock of the optical connector provided by the anti-disengagement mechanism 6. Subsequently, as the pull-tab 30 is pulled further, the projections 17 come in contact with the inner edges of the holes 33, which prevents further movement of the pull-tab 30 in the removal direction relative to the case 10. The case 10 thus moves in the removal direction together with the pull-tab 30, and is uncoupled from the cage 5.

When a force causing the pull-tab 30 to be pulled off of the cage 5 is no longer exerted, the pull-tab 30 moves in the insertion direction as illustrated in FIGS. 1A and 1B to return to its original position due to the elastic restoration force of the elastically deformed arms 35 and 36.

The related-art optical connector is configured such that the pull-tab moves in the insertion direction to return to its original position due to the elastic force of a coil spring (hereinafter referred to as a spring) disposed in the case when a force causing the pull-tab to move in the removal direction is no longer exerted. The spring in the case is thus an essential element, the provision of which causes the number of components to be increased. Further, additional assembling steps are needed to attach the spring to the case when assembling the optical connector. Moreover, the spring is a minute component having elasticity, which makes it burdensome to attach the spring to the case, and there is also a risk of the spring being lost.

Whereas in the optical connector of the first embodiment, the movement of the pull-tab 30 in the removal direction causes the protuberances 37 and 38 of the arms 35 and 36 to slide on the inner walls of the guide grooves 15 and 16, respectively, thereby deforming the arms 35 and 36 to increase the distance between the tips thereof. When a force causing the pull-tab 30 to move in the removal direction is no longer exerted, the pull-tab 30 moves in the insertion direction to return to its original position due to the elastic restoration force of the elastically deformed arms 35 and 36. There is thus no need to provide a spring inside the case 10, which serves to reduce the number of components and the number of assembling steps.

In the optical connector of the first embodiment, the arms 35 and 36 are engaged with the guide grooves 15 and 16, respectively, of the lower case 12 while being maintained in an elastically deformed state. Because of this, a force (e.g., stronger than 1N) generated by the elastic deformation of the arms 35 and 36 urges the pull-tab against the lower case 12 in the insertion direction, thereby reducing looseness in the connection between the pull-tab 30 and the lower case 12.

In the following, assembling of the optical connector according to the first embodiment will be described. FIGS. 6A through 6D are drawings illustrating the assembling of the optical connector illustrated in FIGS. 1A and 1B.

As illustrated in FIG. 6A, the pull-tab 30 is engaged with the lower case 12 while the tips of the latch 32 widen in the width direction of the optical connector. In so doing, the tips of the arms 35 and 36 are situated further on the right in the drawing than the right ends of the guide grooves 15 and 16 when the pull-tab 30 is engaged with the lower case 12.

Subsequently, as illustrated in FIG. 6B, the pull-tab 30 engaged with the lower case 12 is pulled in the removal direction to cause the protuberances 37 and 38 at the tips of the arms 35 and 36 to engage with the right ends of the guide grooves 15 and 16, respectively.

Figure 6C:
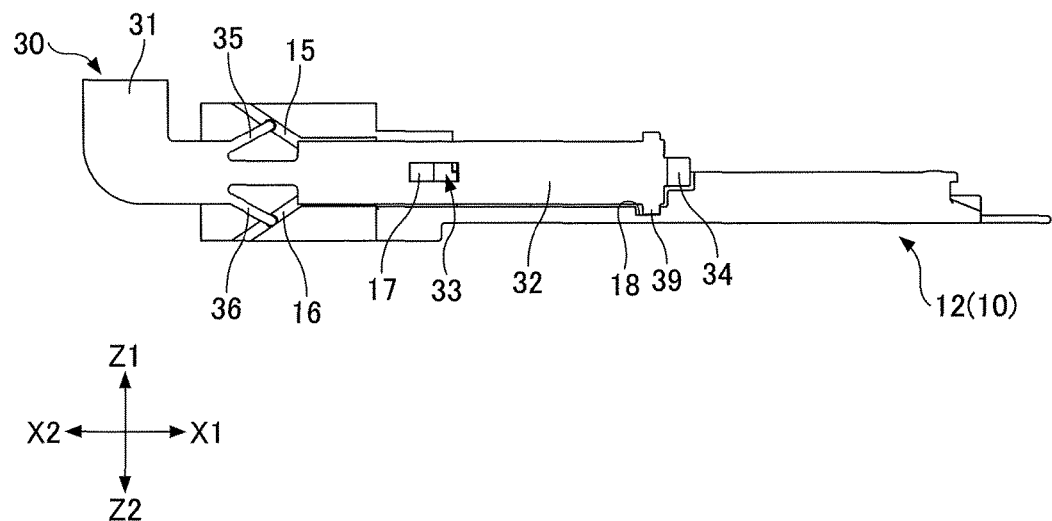

As illustrated in FIG. 6C, the pull-tab 30 is further pulled in the removal direction to cause the protuberances 37 and 38 to slide on the inner walls of the guide grooves 15 and 16, respectively, so that the arms 35 and 36 elastically deform to increase the distance between the tips thereof. Moreover, the projection 17 formed on each lateral face of the lower case 12 is engaged with a respective one of the holes 33 formed in the latch 32. As the pull-tab 30 is urged in the X1 direction due to the elasticity of the arms 35 and 36, the projection 17 comes in contact with the edge of the hole 33 on the X2 side, thereby restricting the movement of the pull-tab 30 in the insertion direction. As illustrated in FIG. 6C, thus, the state in which the arms 35 and 36 engaged with the guide grooves 15 and 16 are open is maintained, with the arms 35 and 36 being constantly in an elastically deformed state. As a result, the pull-tab is constantly urged in the X1 direction. Further, a protuberance 39 formed at the tip of the latch 32 is engaged with a recess 18 formed in the lateral face of the lower case 12. This arrangement restricts the outward movement of the tip of the lock disabling pin 34.

Figure 6D:
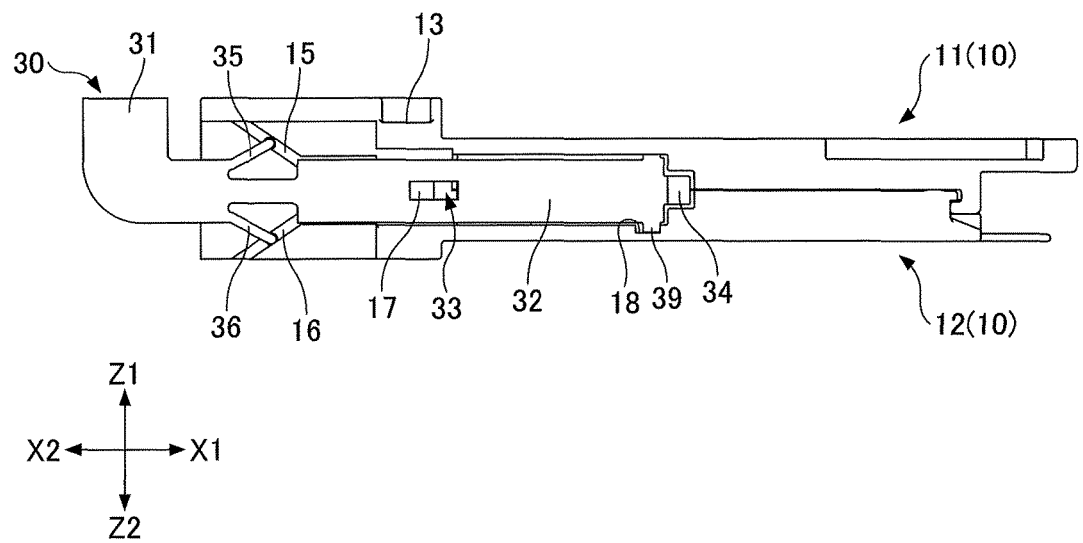

Subsequently, as illustrated in FIG. 6D, the upper case 11 is placed on the lower case 12, and screws inserted into the pass holes 13 of the upper case 11 are threadably engaged with the screw holes 14 of the lower case 12, thereby fastening the upper case 11 to the lower case 12.

The assembling of the optical connector of the first embodiment has been described above. FIGS. 6A through 6D omit the illustration of an optical module, a printed board, a cable boot, and the like stored in the case 10.

In the first embodiment, there is no need to provide a spring in the case 10 when assembling the optical connector: There is no burdensome task of attaching the spring to the case 10, and there is no risk of the spring being lost. The number of components and the number of assembling steps are thus reduced.

The first embodiment is directed to an example in which the two arms 35 and 36 slide on the inner walls of the guide grooves 15 and 16, respectively, to elastically deform. This is not a limiting example, and only one of the arms may be provided.

<Second Embodiment>

Figure 7A:
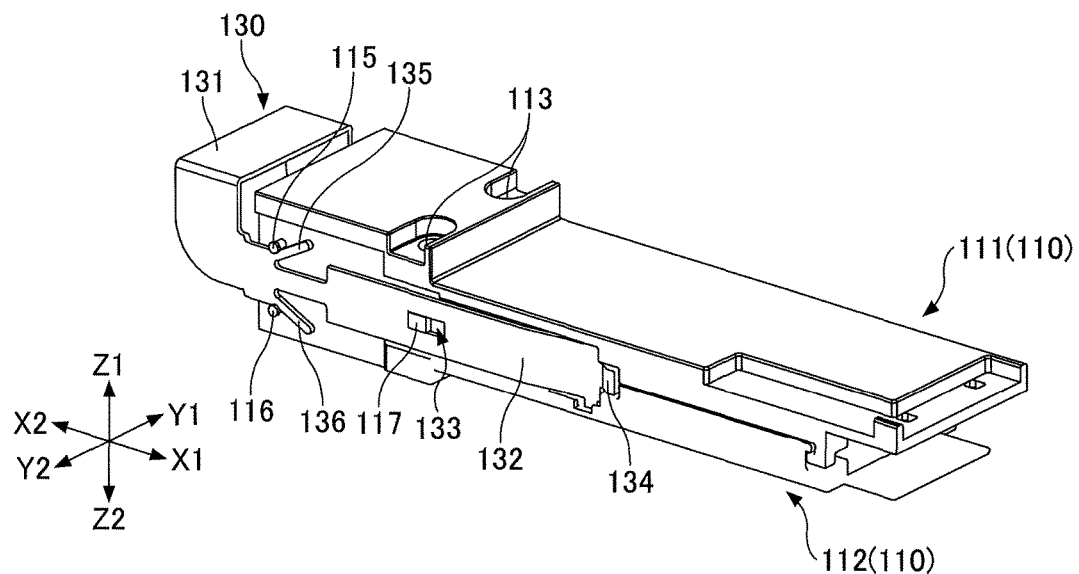
FIGS. 7A and 7B are drawings illustrating an optical connector of a second embodiment.
Figure 7B:
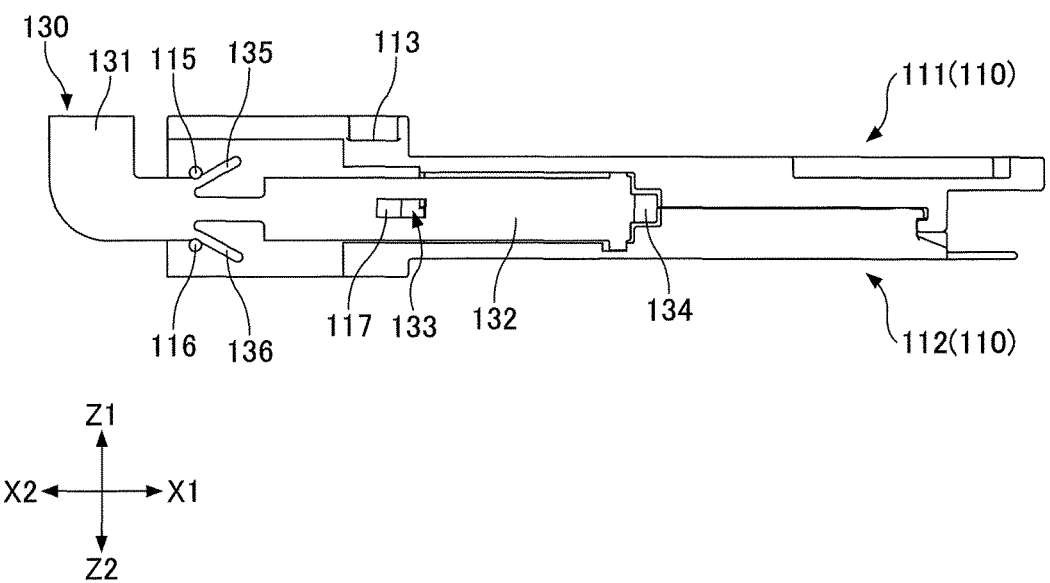
Figure 8A:
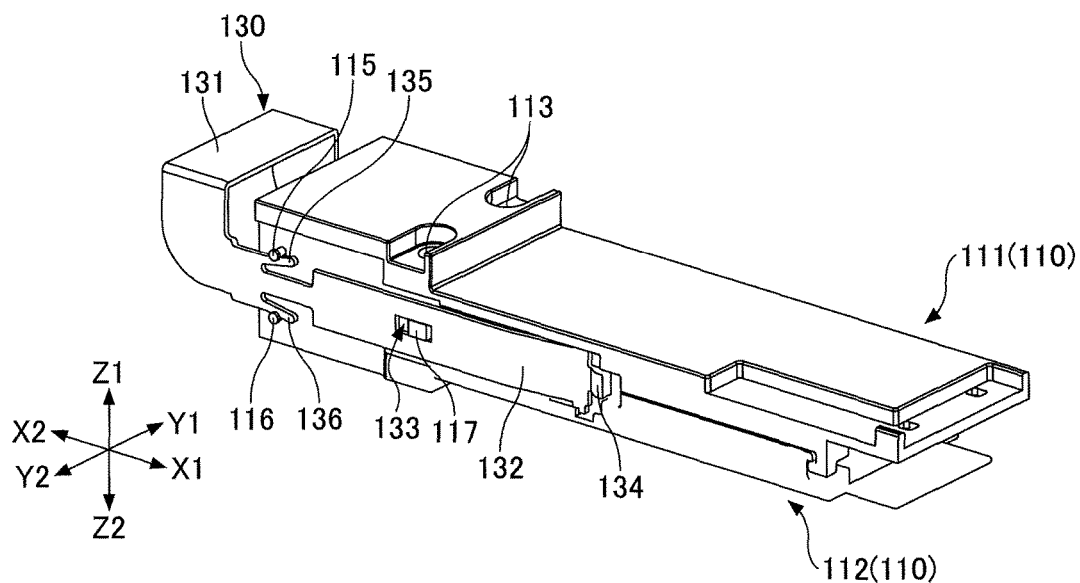
FIGS. 8A and 8B are drawings illustrating the optical connector of the second embodiment.
Figure 8B:
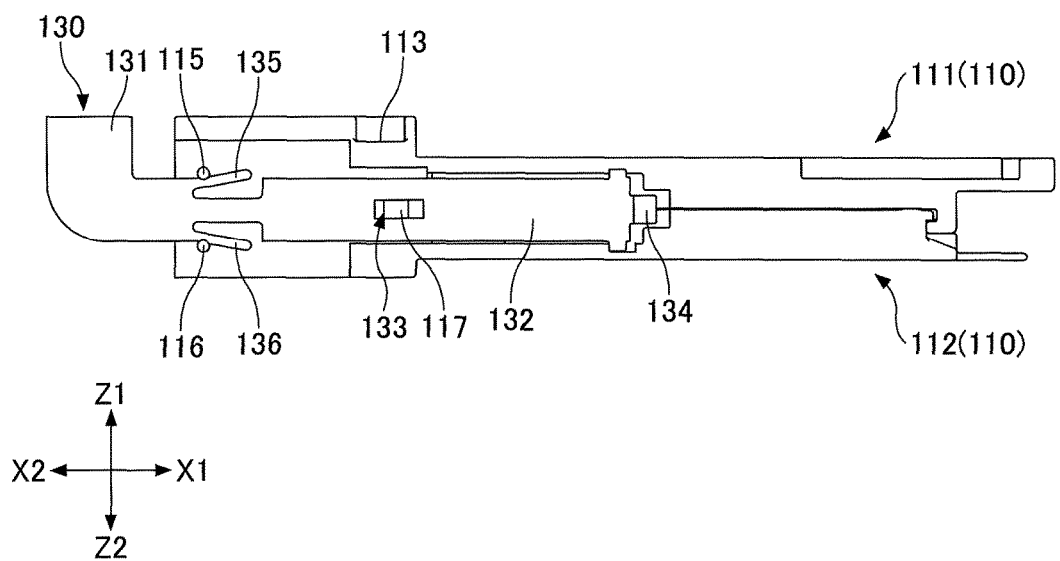

In the following, an optical connector according to a second embodiment will be described. FIGS. 7A and 7B and FIGS. 8A and 8B are drawings illustrating the optical connector of the second embodiment. FIGS. 7A and 7B illustrate the optical connector in a locked state, and FIGS. 8A and 8B illustrate the optical connector in an unlocked state. FIG. 7A and FIG. 8A are isometric views, and FIG. 7B and FIG. 8B are side-elevation views.

In the optical connector of the second embodiment as illustrated in FIGS. 7A and 7B and FIGS. 8A and 8B, the arms 135 and 136 of a latch 132 slide on the surface of guide pins 115 and 116 formed on the lateral faces of a lower case 112, thereby being elastically deformed such that the tips of the arms 135 and 136 come close to each other. The optical connector of the second embodiment may be assembled similarly to the first embodiment.

A case 110 includes an upper case 111 and the lower case 112 as in the first embodiment. The upper case 111 and the lower case 112 are fastened to each other by screws inserted into pass holes 113 and threadably engaged with screw holes 114.

Figure 9A:
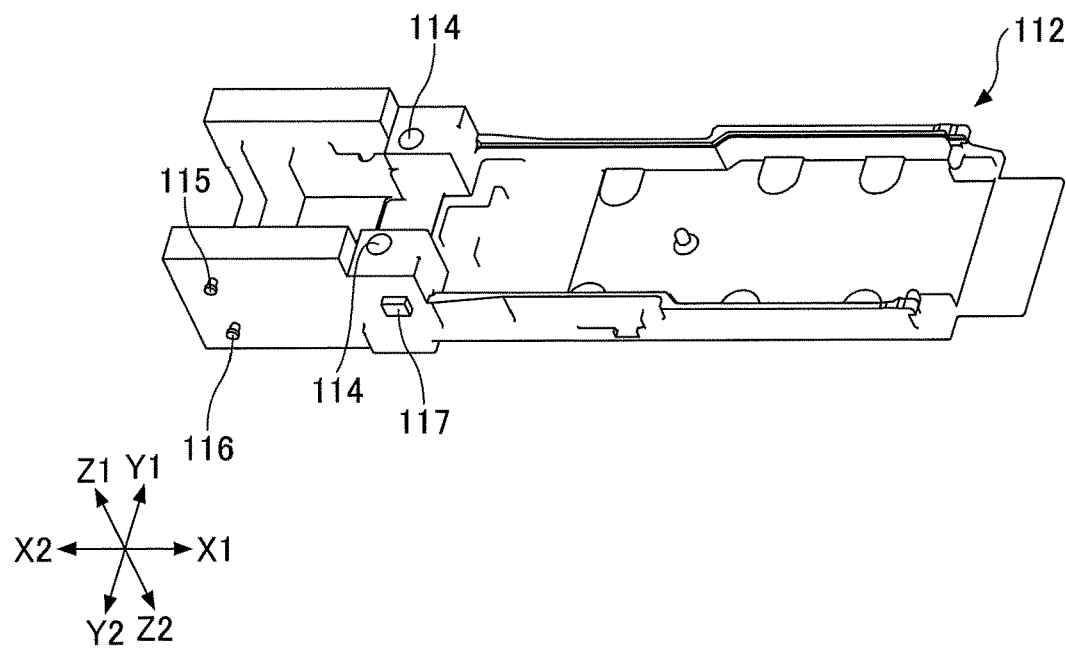
FIGS. 9A and 9B are drawings illustrating a lower case of the optical connector illustrated in FIGS. 7A and 7B.
Figure 9B:
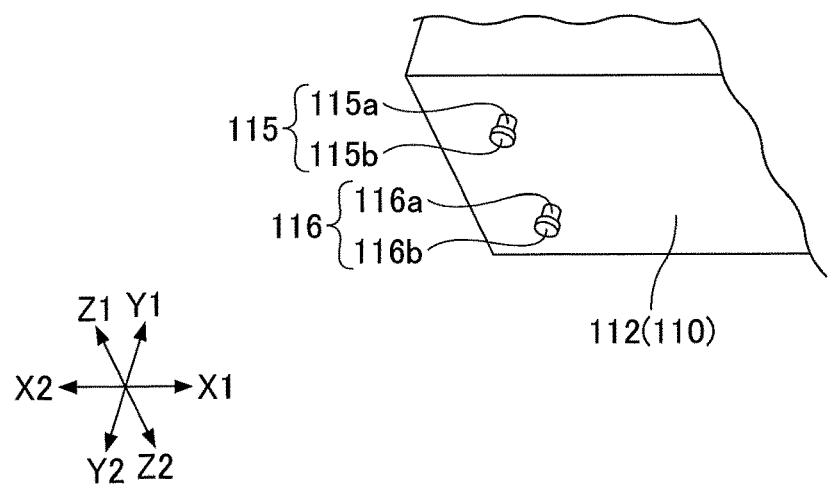

FIGS. 9A and 9B are schematic views of the lower case 112. FIG. 9A is an axonometric view, and FIG. 9B is a partial enlarged view of what is shown in FIG. 9A.

The lower case 112 has the guide pins 115 and 116 formed on the lateral face on the Y2 side and projecting in the Y2 direction. The guide pin 115 is situated above the approximate vertical center of the lateral face of the lower case 112. The guide pin 116 is situated below the approximate vertical center of the lateral face of the lower case 112. As illustrated in FIG. 9B, the guide pin 115 includes a first pin 115a having a first outer diameter and a second pin 115b having a second outer diameter greater than the first outer diameter and situated further away from the lateral face of the lower case 112 than the first pin 115a. Similarly to the guide pin 115, the guide pin 116 includes a first pin 116a and a second pin 116b. The guide pins 115 and 116 are also formed on the lateral face of the lower case 112 on the Y1 side. Each of the lateral faces of the lower case 112 has a rectangular projection 117 projecting outwardly.

Figure 10:
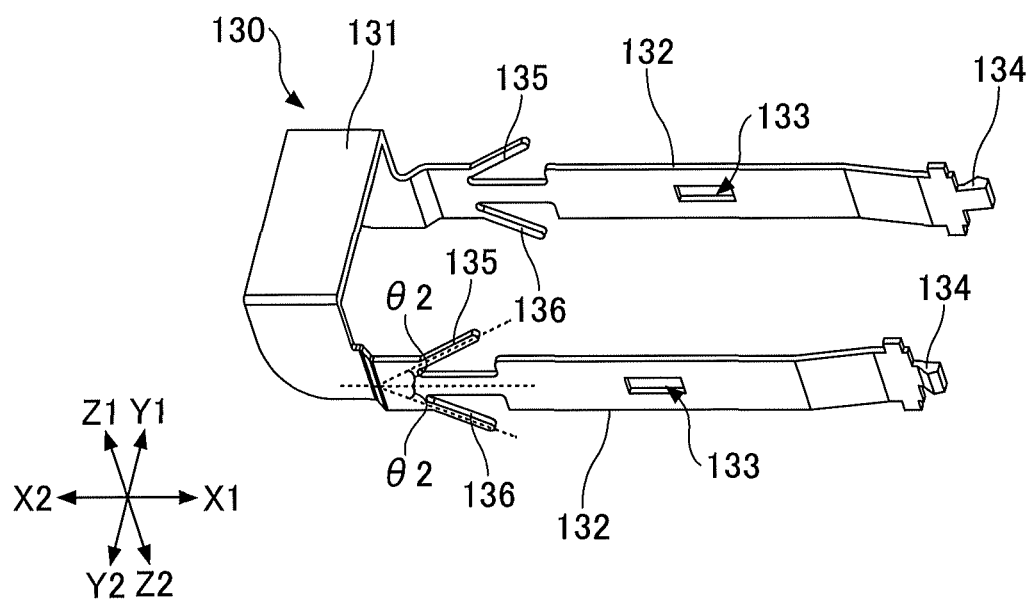
FIG. 10 is a drawing illustrating a pull-tab of the optical connector illustrated in FIGS. 7A and 7B.

FIG. 10 is a schematic view illustrating the pull-tab 130.

The pull tab 130 is used when the optical connector inserted into a cage is pulled off of the cage. The pull-tab 130 includes a body 131 and a latch 132. In the illustrated example, the body 131 and the latch 132 are formed as one seamless piece. Alternatively, the body 131 and the latch 132 may be formed as separate pieces.

The latch 132, which extends in the insertion direction from the body 131, has rectangular holes 133. Each of the holes 133 is a rectangular shape such that a vertical length is slightly longer than the vertical length of the projection 117, and a length in the removal direction is longer than the length of the projection 17 in the removal direction. The holes 133 are engaged with the projections 117 to restrict the vertical movement of the latch 132 with respect to a case 110, such that the latch 132 is movable by a predetermined amount in the removal direction or in the insertion direction with respect to the case 110.

Each tip of the latch 132 has a lock disabling pin 134. The cage into which the optical connector is inserted has an anti-disengagement mechanism that prevents the optical connector from disengaging from the cage. The lock disabling pin 134 serves to disable the lock of the optical connector provided by the anti-disengagement mechanism.

The latch 132 has the arms 135 and 136. The arm 135 extends upwardly at an angle θ2 to the insertion direction. The arm 136 extends downwardly at an angle θ2 to the insertion direction. The angle θ2 may be 30 degrees to 40 degrees, and may be determined in response to the material of the arms 135 and 136. The material and thickness of the arms 135 and 136 may be the same as or similar to those of the arms 35 and 36 of the first embodiment.

Moving the pull-tab 130 in the removal direction or in the insertion direction causes the arms 135 and 136 to slide on the surface of the first pins 115a and 116a, respectively. The second pins 115b and 116b having a greater diameter than the first pins 115a and 116a are formed at the distal ends of the first pins 115a and 116a, respectively. With this arrangement, the second pins 115b and 116b prevent the arms 135 and 136 from moving away from the lower case 112 even when a force is applied to the latch 132 in the direction away from the lower case 112. The arms 135 and 136 are thus prevented from disengaging from the guide pins 115 and 116, respectively.

When pulling off the optical connector inserted into the cage, the user pulls the body 131 in the X2 direction. This pulling action causes the pull-tab 130 to move in the removal direction as illustrated in FIGS. 8A and 8B. When this happens, the arms 135 and 136 slide on the surface of the guide pins 115 and 116, respectively, so that the arms 135 and 136 elastically deform to decrease the distance between the tips thereof. As the lock disabling pins 134 move in the removal direction together with the movement of the latch 132, the lock disabling pins 134 function to push the anti-disengagement mechanism outwardly, thereby disabling the lock of the optical connector provided by the anti-disengagement mechanism. Subsequently, as the pull-tab 130 is pulled further, the projections 117 come in contact with the inner edges of the holes 133, which prevents further movement of the pull-tab 130 in the removal direction relative to the case 110. The case 110 thus moves in the removal direction together with the pull-tab 130, and is uncoupled from the cage.

When a force causing the pull-tab 130 to be pulled off of the cage is no longer exerted, the pull-tab 130 moves in the insertion direction as illustrated in FIGS. 7A and 7B to return to its original position due to the elastic restoration force of the elastically deformed arms 135 and 136.

In the optical connector of the second embodiment as described above, the arms 135 and 136 slide on the surface of the guide pins 115 and 116, respectively, so that the arms 135 and 136 elastically deform to decrease the distance between the tips thereof. When a force causing the pull-tab 130 to move in the removal direction is no longer exerted, the pull-tab 130 moves in the insertion direction to return to its original position due to the elastic restoration force of the arms 135 and 136. There is thus no need to provide a spring inside the case 110, which serves to reduce the number of components and the number of assembling steps.

Similarly to the first embodiment, the arms 135 and 136 of the optical connector of the second embodiment are engaged with the guide pins 115 and 116, respectively, while being constantly in an elastically deformed state. Because of this, a force generated by the elastic deformation of the arms 135 and 136 urges the pull-tab 130 against the lower case 112 in the insertion direction, thereby reducing looseness in the connection between the pull-tab 130 and the lower case 112.

In the optical connector of the second embodiment, the arms 135 and 136 have no protuberances, and are formed to be coplanar with the latch 132, which makes it easier to form the arms 135 and 136.

The second embodiment is directed to an example in which the two arms 135 and 136 slide on the surface of the guide pins 115 and 116, respectively, to elastically deform. This is not a limiting example, and only one of the arms may be provided.

<Third Embodiment>

Figure 11A:
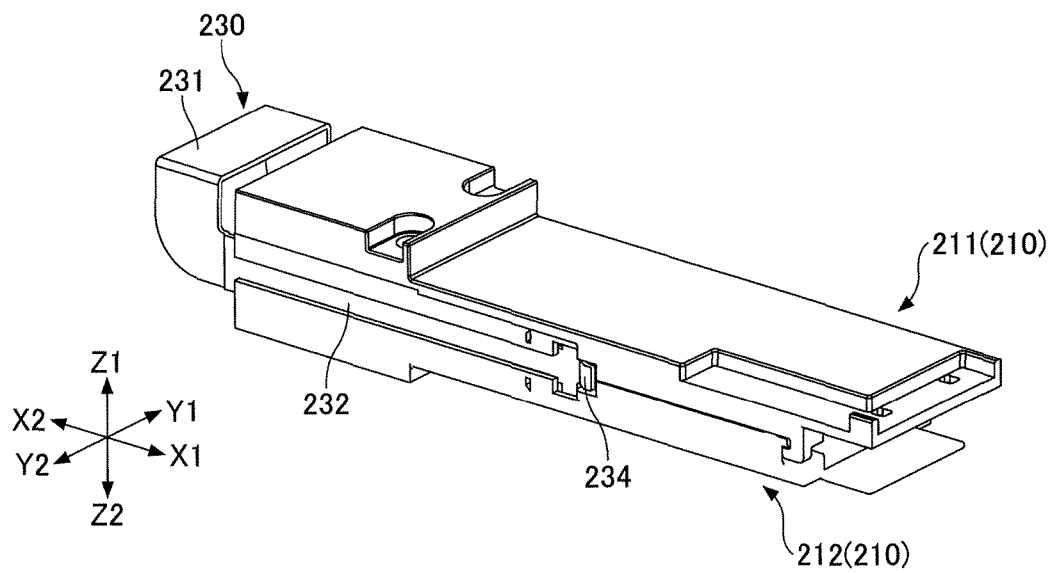
FIGS. 11A through 11C are drawings illustrating an optical connector of a third embodiment.
Figure 11B:
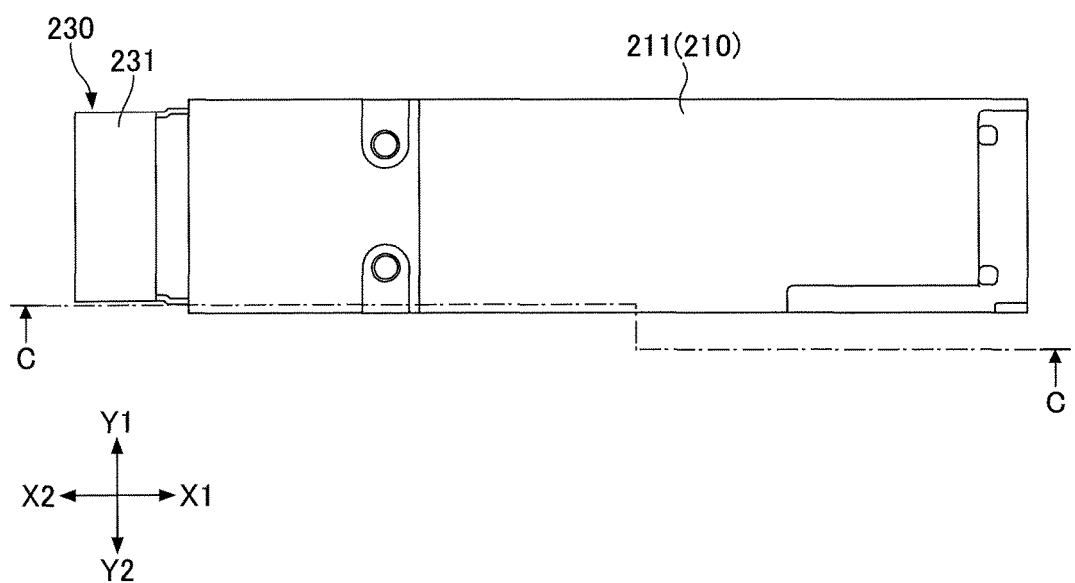
Figure 11C:
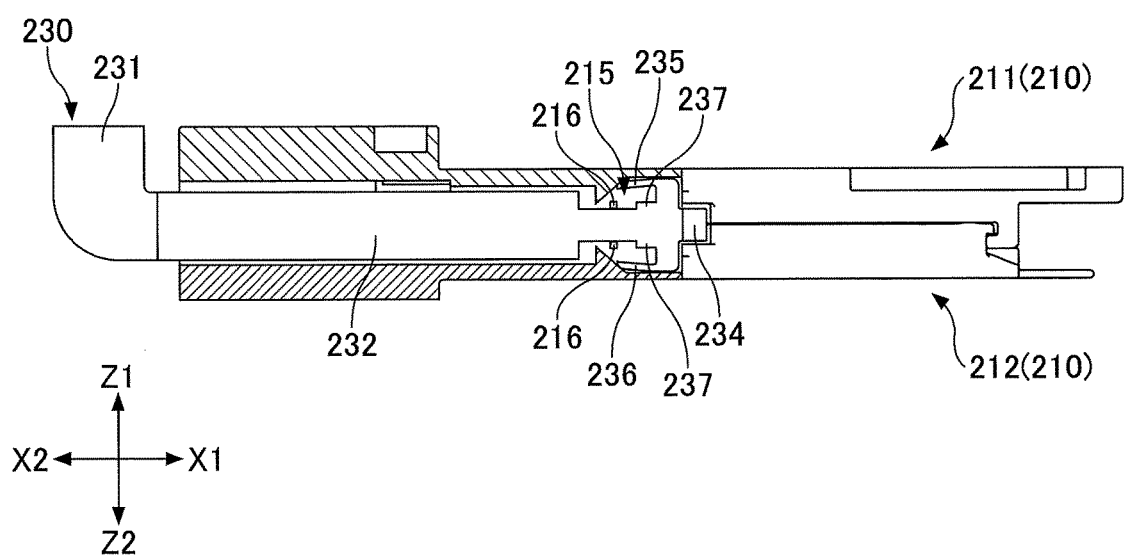
Figure 12A:
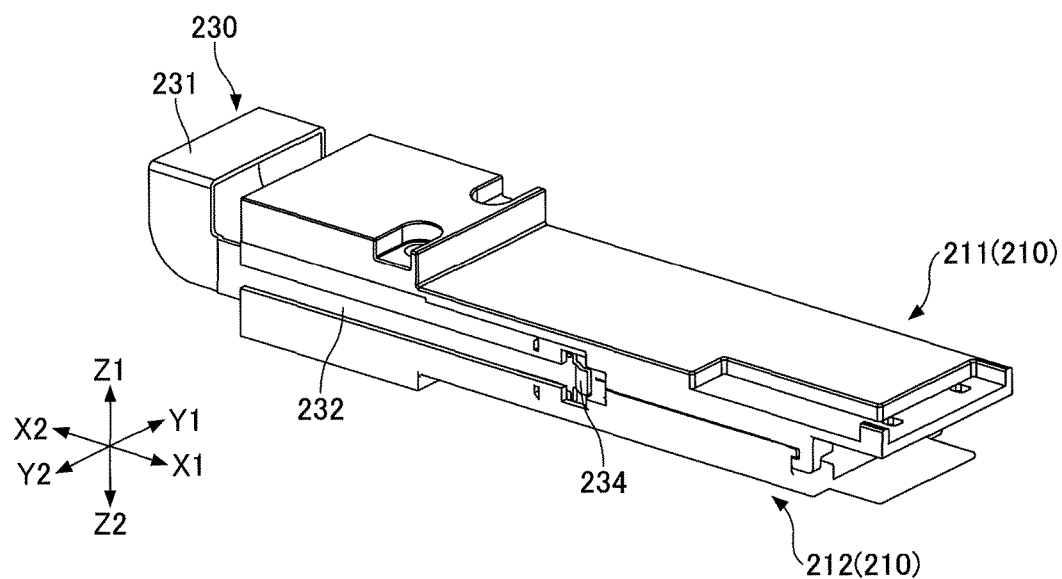
FIGS. 12A through 12C are drawings illustrating the optical connector of the third embodiment.
Figure 12B:
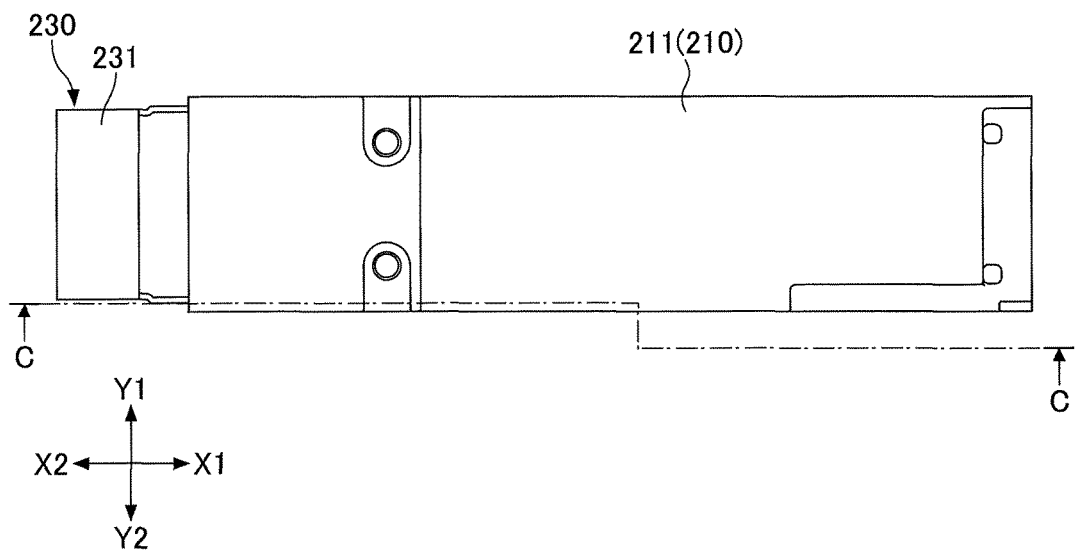
Figure 12C:
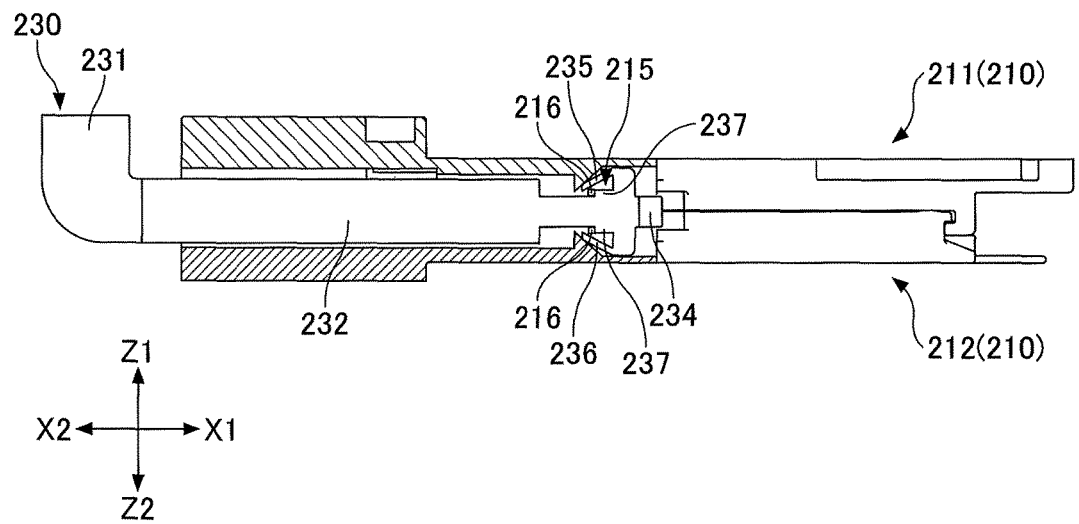

FIGS. 11A through 11C and FIGS. 12A through 12C are drawings illustrating an optical connector of the third embodiment. FIGS. 11A through 11C illustrate the optical connector in a locked state, and FIGS. 12A through 12C illustrate the optical connector in an unlocked state. FIG. 11A and FIG. 12A are isometric views, and FIG. 11B and FIG. 12B are top views. FIG. 11C and FIG. 12C are cross-sectional views taken along the dash dot line C-C shown in FIGS. 11B and 12B, respectively.

As illustrated in FIGS. 11A through 11C and FIGS. 12A through 12C, the optical connector of the third embodiment has arms 235 and 236 formed at the tips of a latch 232. The optical connector of the third embodiment may be assembled similarly to the first embodiment.

The optical connector includes a case 210 and a pull-tab 230.

Similarly to the previously described embodiments, the case 210 includes an upper case 211 and a lower case 212 which are fastened to each other by screws.

The lower case 212 has a guide groove 215 recessed in each lateral face. The guide groove 215 has a protuberance 216 projecting from an inner face (bottom face) thereof.

Figure 13:
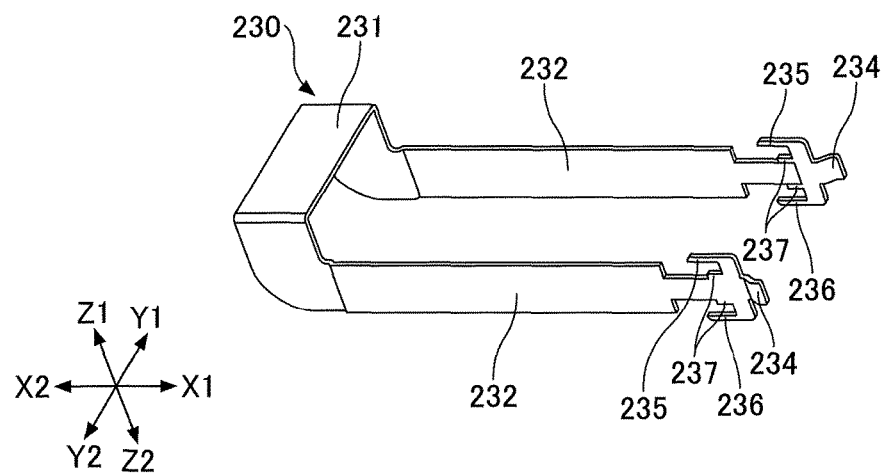
FIG. 13 is a drawing illustrating a pull-tab of the optical connector illustrated in FIGS. 11A through 11C.

FIG. 13 is a schematic view illustrating the pull-tab 230.

The pull tab 230 is used when the optical connector inserted into a cage is pulled off of the cage. The pull-tab 230 includes a body 231 and the latch 232. In the illustrated example, the body 231 and the latch 232 are formed as one seamless piece. Alternatively, the body 231 and the latch 232 may be formed as separate pieces.

The latch 232 extends in the insertion direction from the body 231. Each tip of the latch 232 has a lock disabling pin 234.

The latch 232 has arms 235 and 236. The arms 235 and 236 extend in the removal direction from the tip of the latch 232. The arms 235 and 236 and the remaining portions of the latch 232 are formed as one seamless piece. The material and thickness of the arms 235 and 236 may be the same as or similar to those of the arms 35 and 36 of the first embodiment.

The latch 232 has a stopper 237 which comes in contact with the protuberance 216 upon the pull-tab 230 being pulled in the removal direction so as to restrict the movement of the pull-tab 230 in the removal direction.

Moving the pull-tab 230 in the removal direction or in the insertion direction causes the arms 235 and 236 to slide on the inner walls of the guide groove 215.

When pulling off the optical connector inserted into the cage, the user pulls the body 231 in the X2 direction. This pulling action causes the pull-tab 230 to move in the removal direction as illustrated in FIGS. 12A through 12C. When this happens, the arms 235 and 236 slide on the inner walls of the guide groove 215, so that the arms 235 and 236 elastically deform to decrease the distance between the tips thereof.

When a force causing the pull-tab 230 to be pulled off of the cage is no longer exerted, the pull-tab 230 moves in the insertion direction as illustrated in FIGS. 11A through 11C to return to its original position due to the elastic restoration force of the elastically deformed arms 235 and 236.

In the optical connector of the third embodiment as described above, moving the pull-tab 230 in the removal direction causes the arms 235 and 236 to slide on the inner walls of the guide grooves 215, so that the arms 235 and 236 are elastically deformed to decrease the distance between the tips thereof. When a force causing the pull-tab 230 to move in the removal direction is no longer exerted, the pull-tab 230 moves in the insertion direction to return to its original position due to the elastic restoration force of the arms 235 and 236. Because of this, there is no need to provide a spring inside the case 210.

The third embodiment is directed to an example in which the two arms 235 and 236 slide on the inner walls of the guide grooves 215 to elastically deform. This is not a limiting example, and only one of the arms may be provided.

<Fourth Embodiment>

Figure 14A:
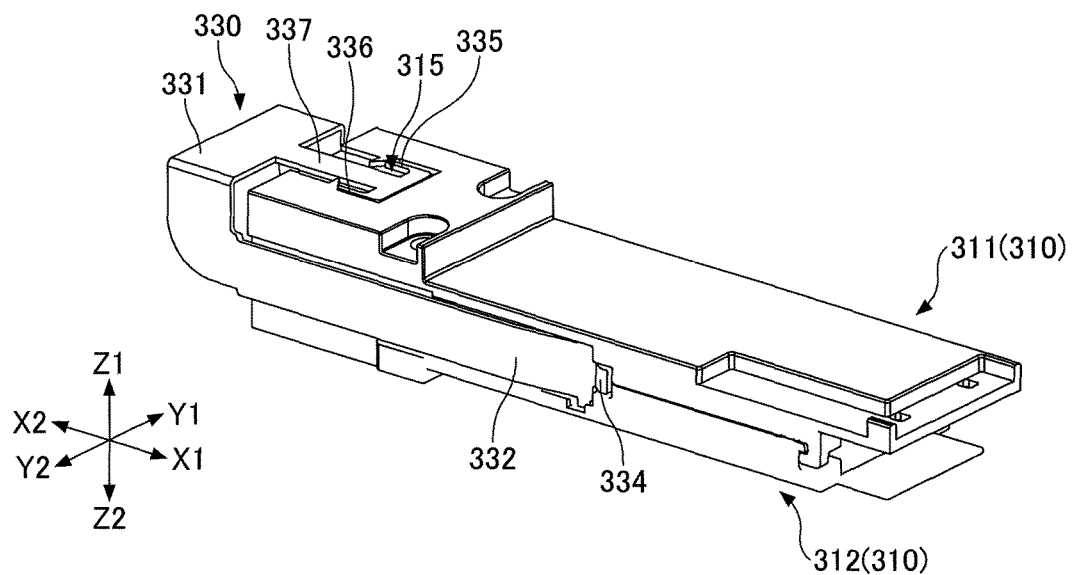
FIGS. 14A and 14B are drawings illustrating an optical connector of a fourth embodiment.
Figure 14B:
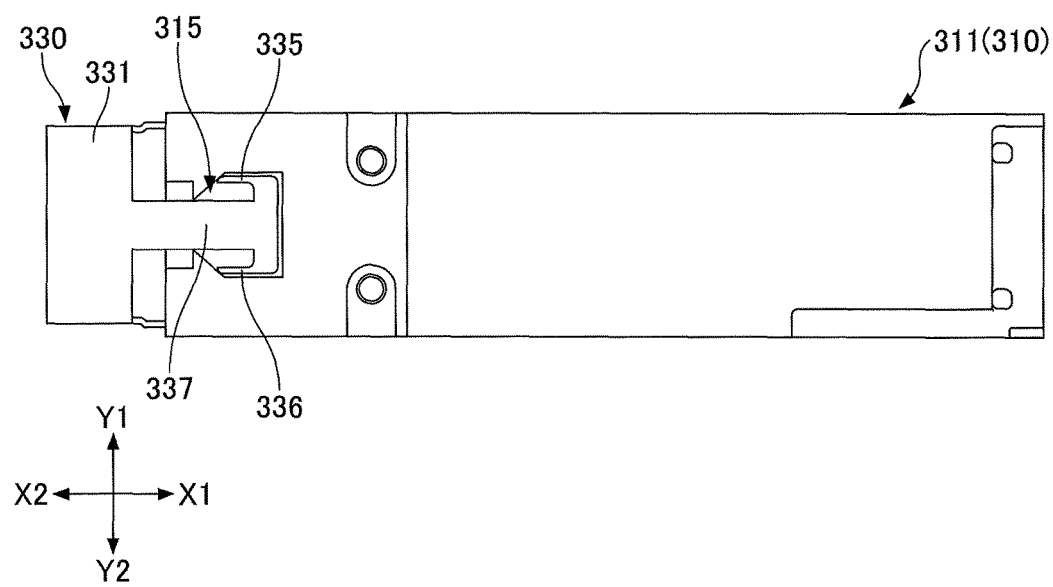
Figure 15A:
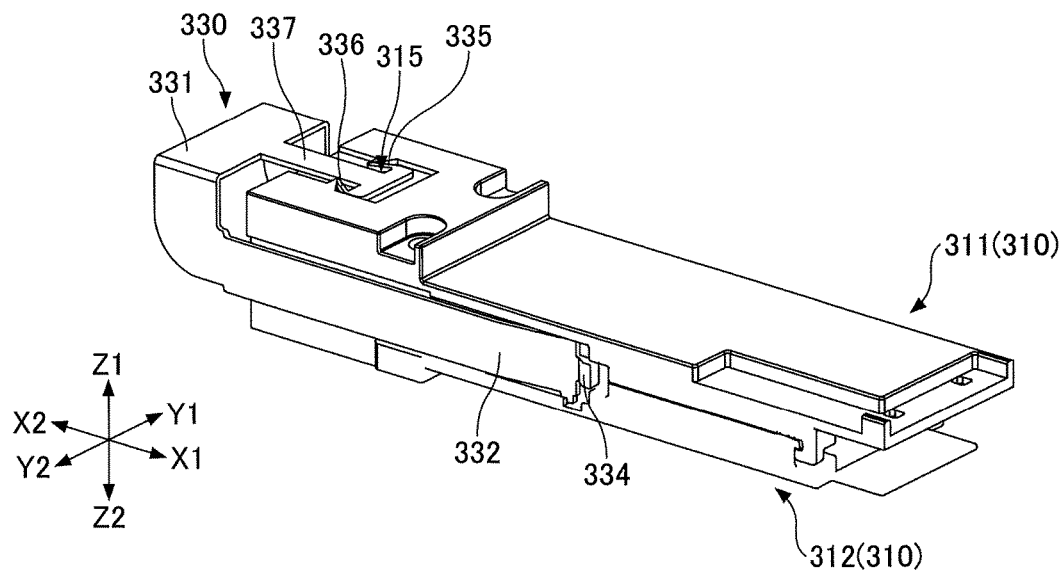
FIGS. 15A and 15B are drawings illustrating the optical connector of the fourth embodiment.
Figure 15B:
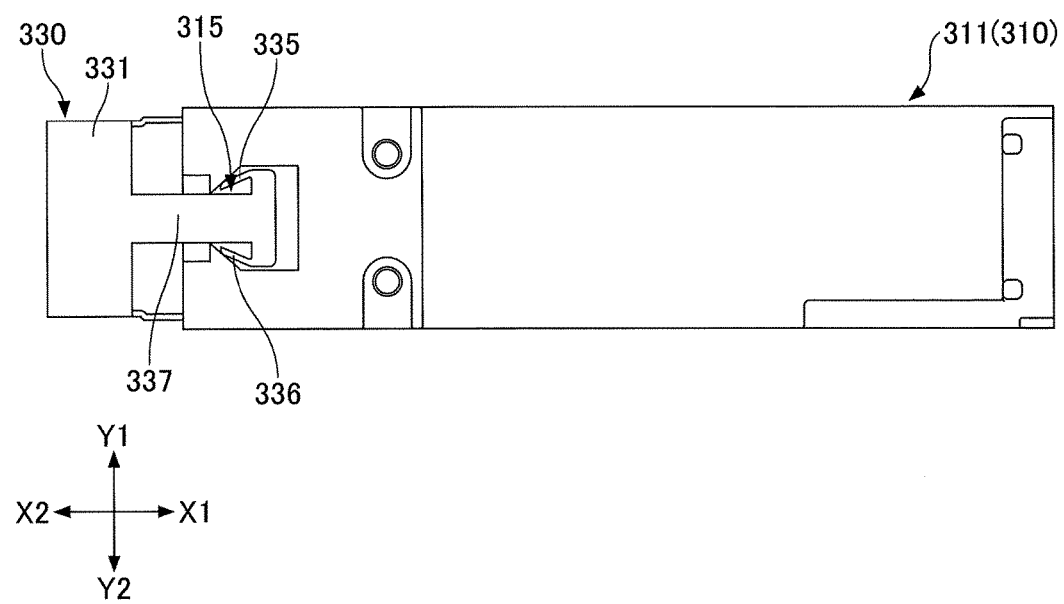

FIGS. 14A and 14B and FIGS. 15A and 15B are drawings illustrating an optical connector of the fourth embodiment. FIGS. 14A and 14B illustrate the optical connector in a locked state, and FIGS. 15A and 15B illustrate the optical connector in an unlocked state. FIG. 14A and FIG. 15A are isometric views, and FIG. 14B and FIG. 15B are top views. As illustrated in FIGS. 14A and 14B and FIGS. 15A and 15B, the optical connector of the fourth embodiment has arms situated above an upper case 311 rather than on the sides of a lower case 312. The optical connector of the fourth embodiment may be assembled similarly to the third embodiment.

The optical connector includes a case 310 and a pull-tab 330.

The case 310 includes the upper case 311 and the lower case 312, which are fastened to each other through screws. The upper case 311 has a guide groove 315 recessed (in the Z2 direction) in the upper face.

Figure 16A:
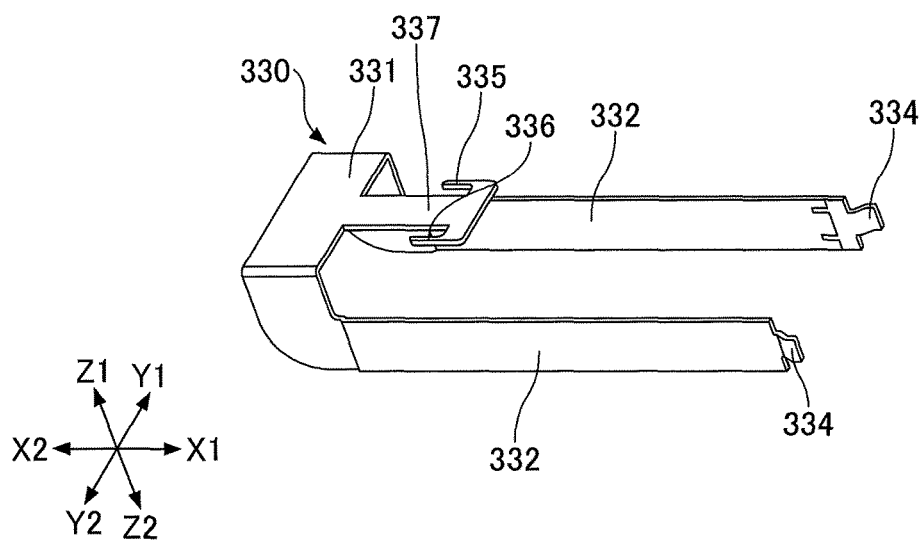
FIGS. 16A and 16B are drawings illustrating a pull-tab of the optical connector illustrated in FIGS. 14A and 14B.
Figure 16B:
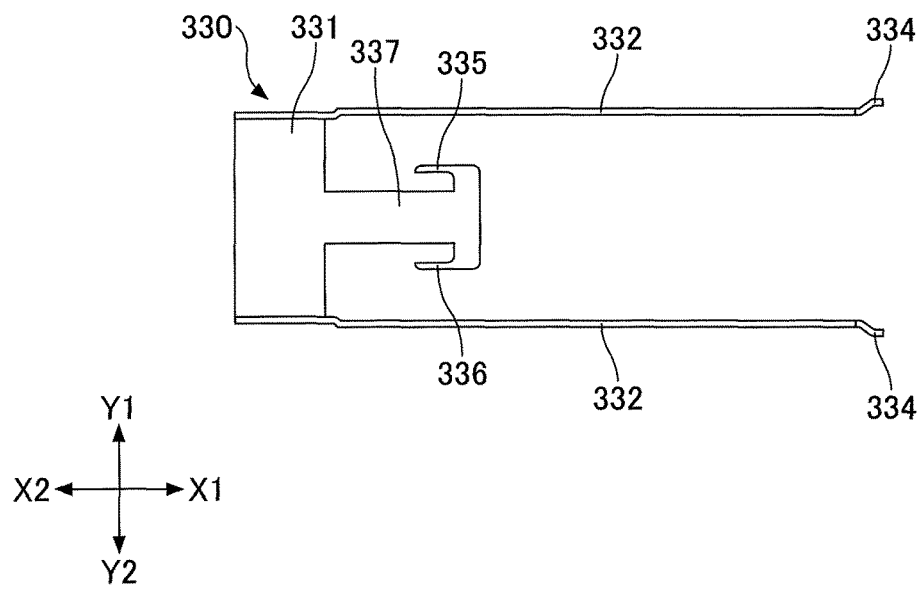

FIGS. 16A and 16B are schematic views illustrating the pull-tab 330.

The pull-tab 330 includes a body 331, a latch 332, and an arm support 337. In the illustrated example, the body 331, the latch 332, and the arm support 337 are formed as one seamless piece. Alternatively, the body 331, the latch 332, and the arm support 337 may be formed as separate pieces.

The latch 332, which extends in the insertion direction from the body 331, has lock disabling pins 334 at the tips thereof.

The arm support 337 extends in the insertion direction from the body 331. Arms 335 and 336 are formed at the tip of the arm support 337. The arms 335 and 336 extend in the removal direction from the tip of the arm support 337. The arms 335 and 336 and the remaining portions of the arm support 337 are formed as one seamless piece. The material and thickness of the arms 335 and 336 may be the same as or similar to those of the arms 35 and 36 of the first embodiment.

Moving the pull-tab 330 in the removal direction or in the insertion direction causes the arms 335 and 336 to slide on the inner walls of the guide groove 315.

When pulling off the optical connector inserted into the cage, the user pulls the body 331 in the X2 direction. This pulling action causes the pull-tab 330 to move in the removal direction as illustrated in FIGS. 15A and 15B. When this happens, the arms 335 and 336 slide on the inner walls of the guide groove 315, so that the arms 335 and 336 elastically deform to decrease the distance between the tips thereof.

The lock disabling pins 334 move in the removal direction in response to the movement of the latch 332, which disables the lock of the optical connector provided by the anti-disengagement mechanism. As the pull-tab 330 is further pulled, the case 310 moves in the removal direction together with the pull-tab 330, and is pulled out of the cage.

When a force causing the pull-tab 330 to be pulled off of the cage is no longer exerted, the pull-tab 330 moves in the insertion direction as illustrated in FIGS. 14A and 14B to return to its original position due to the elastic restoration force of the elastically deformed arms 335 and 336.

In the optical connector of the fourth embodiment as described above, moving the pull-tab 330 in the removal direction causes the arms 335 and 336 to slide on the inner walls of the guide groove 315, so that the arms 335 and 336 are elastically deformed to decrease the distance between the tips thereof. When a force causing the pull-tab 330 to move in the removal direction is no longer exerted, the pull-tab 330 moves in the insertion direction to return to its original position due to the elastic restoration force of the arms 335 and 336. Because of this, there is no need to provide a spring inside the case 310.

The fourth embodiment is directed to an example in which the two arms 335 and 336 slide on the inner walls of the guide groove 315 to elastically deform. This is not a limiting example, and only one of the arms may be provided.

In each of the embodiments described above, the guide grooves 15 and 16, the guide pins 115 and 116, the guide grooves 215, and the guide groove 315 are examples of a guide portion.

Further, the present invention is not limited to these embodiments, but various variations and modifications may be made without departing from the scope of the present invention.

The present application is based on and claims the benefit of priority of Japanese priority application No. 2017-151251 filed on Aug. 4, 2017, with the Japanese Patent Office, the entire contents of which are hereby incorporated by reference.

What is claimed is:

1. An optical connector for detachable coupling to a cage, comprising:
    a case having guide portions; and
    a pull-tab movably attached to the case,
    wherein the pull-tab includes arms made of an elastic material and configured to slide on the guide portions of the case to be elastically deformed upon the pull-tab being moved in a removal direction in which the optical connector is uncoupled from the cage,
    wherein moving the pull-tab in the removal direction relative to the case against an elastic force applied by the arms causes the pull-tab to disable a lock that secures the case to the cage, and
    wherein the pull-tab includes two longitudinal plate members extending in the removal direction along two respective, opposite lateral faces of the case, the arms including two pairs of arm bars, each of the two pairs extending from a corresponding one of the two longitudinal plate members, and the two longitudinal plate members are configured to slide on the two, respective opposite lateral faces in the removal a direction while the arm bars are configured to slide in a second direction that is different from the removal direction.

2. An optical connector for detachable coupling to a cage, comprising:
    a case having a guide portion; and
    a pull-tab movably attached to the case,
    wherein the pull-tab includes an arm made of an elastic material and configured to slide on the guide portion of the case to be elastically deformed upon the pull-tab being moved in a removal direction in which the optical connector is uncoupled from the cage,
    wherein moving the pull-tab in the removal direction relative to the case against an elastic force applied by the arm causes the pull-tab to disable a lock that secures the case to the cage,
    wherein the pull-tab includes a latch extending in the removal direction along a lateral face of the case, and the latch is configured to slide on the lateral face in a first direction while the arm is configured to slide in a second direction that is at an angle to the first direction, and
    wherein the arm has a protuberance formed at a tip thereof and projecting toward the case, and the guide portion is a guide groove recessed in the lateral face of the case and configured to allow the protuberance to slide therein.

3. The optical connector as claimed in claim 2, wherein the guide groove includes a first groove having a first width and a second groove having a second width greater than the first width, and the second groove is situated at a greater depth in the face of the case, and
    wherein the protuberance includes a first part and a second part, the first part projecting from the tip of the arm toward the case, the second part being wider than the first part and configured to slide on an inner wall of the second groove.

4. The optical connector as claimed in claim 1, wherein each of the guide portions is a guide pin projecting from a corresponding one of the lateral faces of the case and configured to allow a corresponding one of the arms to slide on a surface thereof.

5. The optical connector as claimed in claim 4, wherein each of the guide pins includes a first part having a first diameter and a second part having a second diameter greater than the first diameter, and the second part is situated further away from a corresponding one of the lateral faces of the case than the first part, and wherein a corresponding one of the arms is configured to slide on a surface of the first part.

6. The optical connector as claimed in claim 1, wherein the case has a projection projecting from each of the lateral faces thereof, and the pull-tab has a hole formed therein, the hole being engaged with the projection to restrict movement of the pull-tab in the removal direction relative to the case.

7. The optical connector as claimed in claim 1, wherein each of the guide portions is a guide groove recessed in a corresponding one of the lateral faces of the case, and a corresponding one of the arms is elastically deformed by sliding on an inner wall of the guide groove.

8. The optical connector as claimed in claim 7, wherein a bottom face of the guide groove has a protuberance projecting therefrom, and the pull-tab has a stopper formed thereon, the stopper coming in contact with the protuberance to restrict movement of the pull-tab in the removal direction relative to the case.

* * * * *